United States Patent
Wu et al.

(10) Patent No.: US 8,985,466 B2
(45) Date of Patent: Mar. 24, 2015

(54) MULTI-FUNCTION RADIO-FREQUENCY DEVICE, COMPUTER SYSTEM AND METHOD OF OPERATING MULTI-FUNCTION RADIO-FREQUENCY DEVICE

(71) Applicant: Wistron NeWeb Corporation, Hsinchu (TW)

(72) Inventors: Yen-Liang Wu, Hsinchu (TW);
Chia-Hua Chiang, Hsinchu (TW);
Ching-Wen Chen, Hsinchu (TW);
Chih-Chun Peng, Hsinchu (TW)

(73) Assignee: Wistron NeWeb Corporation, Hsinchu Science Park, Hsinchu (TW)

( * ) Notice: Subject to any disclaimer, the term of this patent is extended or adjusted under 35 U.S.C. 154(b) by 83 days.

(21) Appl. No.: 13/707,618

(22) Filed: Dec. 7, 2012

(65) Prior Publication Data
US 2013/0341409 A1    Dec. 26, 2013

(30) Foreign Application Priority Data

Jun. 21, 2012 (TW) .............................. 101122188 A

(51) Int. Cl.
| | | |
|---|---|---|
| G06K 19/06 | (2006.01) | |
| G06K 19/077 | (2006.01) | |
| G06F 1/16 | (2006.01) | |
| H01Q 7/00 | (2006.01) | |
| H01Q 1/22 | (2006.01) | |

(52) U.S. Cl.
CPC .... *G06K 19/07773* (2013.01); *G06K 19/07749* (2013.01); *G06F 1/169* (2013.01); *G06F 1/1698* (2013.01); *H01Q 1/2266* (2013.01); *H01Q 1/2216* (2013.01); *H01Q 7/00* (2013.01)
USPC ................. 235/492; 235/462.46; 235/472.02

(58) Field of Classification Search
CPC ................... G06K 19/07749; G06K 17/0022; G06Q 20/341
USPC ....................................... 235/462.46, 472.02
See application file for complete search history.

(56) References Cited

U.S. PATENT DOCUMENTS

| | | | |
|---|---|---|---|
| 7,928,965 B2 * | 4/2011 | Rosenblatt et al. ........... | 345/173 |
| 2006/0097049 A1 * | 5/2006 | Moore .......................... | 235/440 |
| 2009/0002217 A1 * | 1/2009 | Kryze et al. .................. | 341/176 |
| 2011/0304566 A1 * | 12/2011 | Han .............................. | 345/173 |
| 2012/0162106 A1 * | 6/2012 | Choi et al. .................... | 345/173 |

* cited by examiner

*Primary Examiner* — Daniel St Cyr
(74) *Attorney, Agent, or Firm* — Winston Hsu; Scott Margo

(57) ABSTRACT

A multi-function Radio-Frequency device integrated into a computer system is disclosed and includes a substrate including a first surface and a second surface opposite to each other, a touchpad area disposed on the first surface of the substrate for generating a touch signal according to a touch situation, an antenna disposed on the first surface and/or the second surface of the substrate for receiving and transmitting a Radio-Frequency signal, and a control module disposed on the second surface of the substrate and coupled to the touchpad area and the antenna for generating a touch control signal according to the touch signal and generating an identification signal according to the Radio-Frequency signal to the computer system.

19 Claims, 18 Drawing Sheets

Top view

Side view

MULTI-FUNCTION RADIO-FREQUENCY DEVICE, COMPUTER SYSTEM AND METHOD OF OPERATING MULTI-FUNCTION RADIO-FREQUENCY DEVICE

BACKGROUND OF THE INVENTION

1. Field of the Invention

The present invention relates to a multi-function Radio-Frequency device, a computer system and related method of operating the multi-function Radio-Frequency device, and more particularly, to a multi-function Radio-Frequency device, a computer system and related method of operating the multi-function Radio-Frequency device integrated with a function of touch control and a function of wireless transmission into a single module.

2. Description of the Prior Art

A portable electronic device, such as a laptop computer, a personal digital assistant, or a smart phone, is commonly equipped with a function of wireless communication. Moreover, advances in laptop and pad computer technology also increases requirements for product appearance, wherein a housing made of metal has a significant influence on wireless signal, e.g. signal shielding, which may influence a quality of wireless communication of the computer system. Thus, how to maintain good signal transmission and metal product appearance while integrating an antenna or Radio-Frequency device into the computer system has become a goal of the industry.

SUMMARY OF THE INVENTION

It is therefore an object of present invention to provide a multi-function RF device, a computer system and related method of operating the multi-function RF device.

The present invention discloses a multi-function Radio-Frequency device integrated into a computer system, comprising a substrate including a first surface and a second surface opposite to each other, a touchpad area disposed on the first surface of the substrate for generating a touch signal according to a touch situation touched on the touchpad area by a user, an antenna disposed on the first surface and/or the second surface of the substrate for receiving and transmitting a Radio-Frequency signal, and a control module disposed on the second surface of the substrate and coupled to the touchpad area and the antenna for generating a touch control signal according to the touch signal and generating an identification signal according to the Radio-Frequency signal to the computer system.

The present invention further discloses a computer system, comprising a multi-function Radio-Frequency device, comprising a substrate including a first surface and a second surface opposite to each other, a touchpad area disposed on the first surface of the substrate for generating a touch signal according to a touch situation touched on the touchpad area by a user, an antenna disposed on the first surface and/or the second surface of the substrate for receiving and transmitting a Radio-Frequency signal, and a control module disposed on the second surface of the substrate and coupled to the touchpad area and the antenna for generating a touch control signal according to the touch signal and generating an identification signal according to the Radio-Frequency signal, and a central processor coupled to the multi-function Radio-Frequency device for processing the touch control signal and the identification signal.

The present invention further discloses a method of operating a multi-function Radio-Frequency device integrated into a computer system, the multi-function Radio-Frequency device comprising a substrate including a first surface and a second surface opposite to each other, a touchpad area disposed on the first surface of the substrate for generating a touch signal according to a touch situation touched on the touchpad area by a user, an antenna disposed on the first surface of the substrate and/or the second surface of the substrate for receiving and transmitting a Radio-Frequency signal, and a control module disposed on the second surface of the substrate and coupled to the touchpad area and the antenna for generating a touch control signal according to the touch signal and generating an identification signal according to the Radio-Frequency signal to the computer system, the method of operating the multi-function Radio-Frequency device comprising turning off the touch control unit, and performing Near Field Communication by the antenna.

These and other objectives of the present invention will no doubt become obvious to those of ordinary skill in the art after reading the following detailed description of the preferred embodiment that is illustrated in the various figures and drawings.

DETAILED DESCRIPTION

Currently developed Near Field Communication is a wireless communication technique derived from Radio-Frequency Identity technique, and Near Field Communication is mainly used for a short transmission distance and high operating frequencies. Near Field Communication has its own communication protocols, which allows electronic devices to perform point-to-point data transmission and exchange within a short distance.

Figure 1:
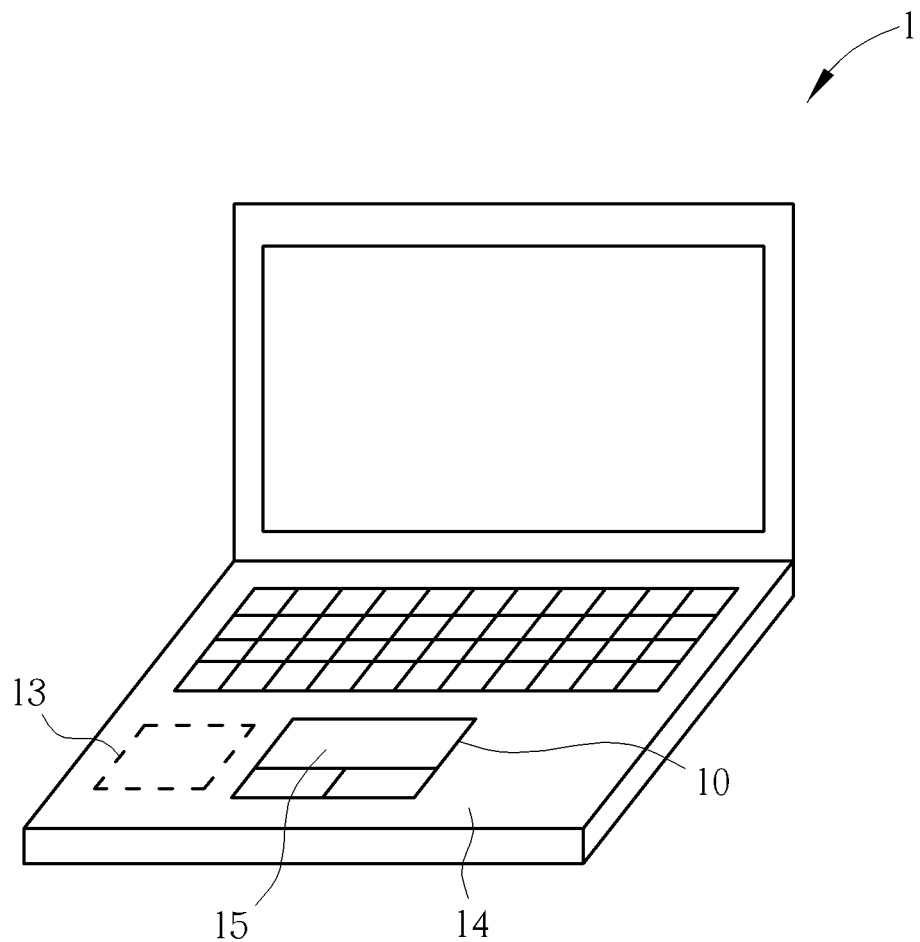
FIG. 1 is a schematic diagram of a computer system according to an embodiment of the present invention.

For integrating the function of Near Field Communication into a computer system, please refer to FIG. 1, which is a schematic diagram of a computer system 1 according to an embodiment of the present invention. In general, the computer system 1 may utilize a built-in Radio-Frequency (hereinafter called RF) device (not shown in FIG. 1) and an antenna to perform wireless communication, and utilize another built-in touchpad device 10 to be a user-interface so that a user may interact with the computer system 1. For example, the user may slide or move fingers on the touchpad device 10 to manipulate a cursor on the computer system 1, or write words to input commands. The touchpad device 10 includes a touchpad area which may be covered with a cover board 15 for protecting the touchpad area from being damaged by exposing to air or water. Therefore, if a housing 14 of the computer system 1 is made of metal materials, and the cover board 15 is made of non-metal materials, e.g. plastic, acrylic or glass, the antenna of the RF device may be disposed between the cover board 15 of the touchpad device 10 and touchpad area to radiate wireless signals from a non-metal area of the cover board 15 to the air.

Figure 2A:
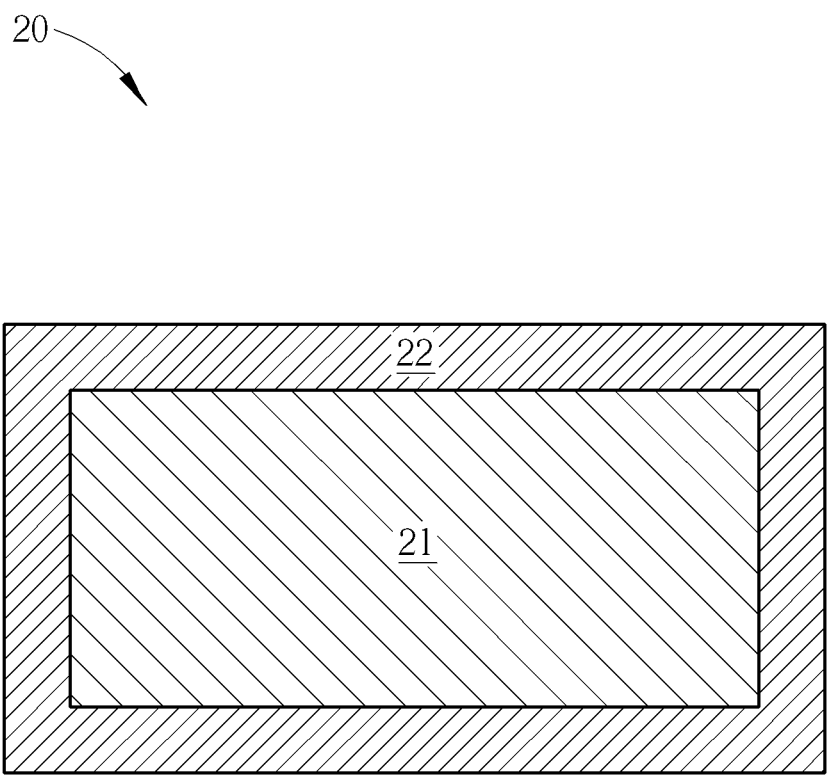
FIG. 2A and FIG. 2B are respectively a top view and a side view of a multi-function RF device according to an embodiment of the present invention.
Figure 2B:
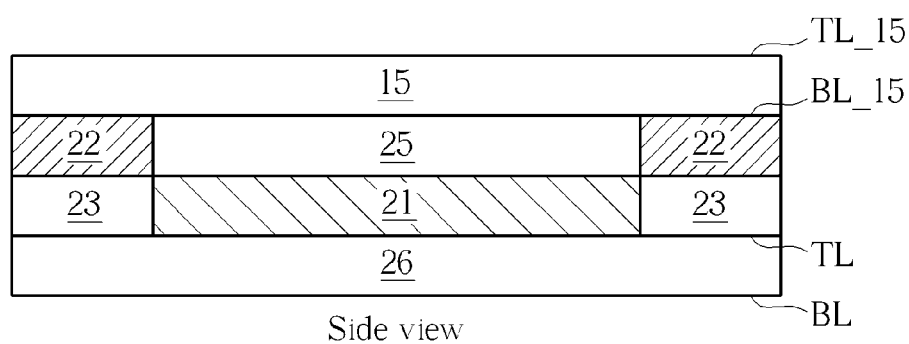
Figure 2B:
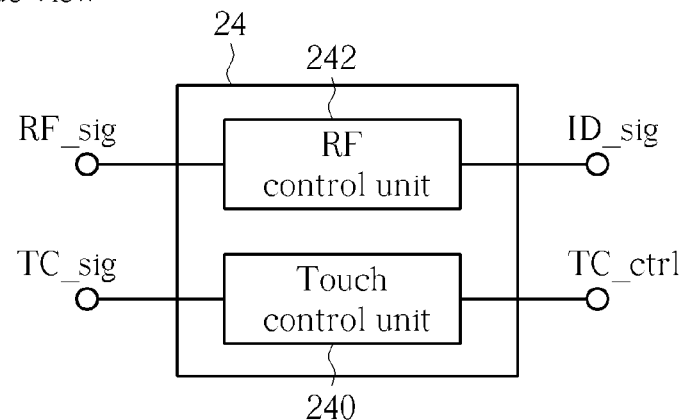

Please refer to FIG. 2A and FIG. 2B, which are respectively a top view and a side view of a multi-function RF device 20 according to an embodiment of the present invention. The multi-function RF device 20 may be combined with the touchpad device with the RF device to be integrated into the computer system 1, so as to perform the function of touch control and the function of wireless transmission or wireless sensor. The multi-function RF device 20 includes a touchpad area 21, an antenna 22, a ferromagnetic sheet 23, a control module 24, the cover board 15 and a substrate 26. The cover board 15 includes a first surface TL_15 and a second surface BL_15 opposite to each other, the substrate 26 includes a surface TL and a second surface BL opposite to each other. The second surface BL_15 of the cover board 15 and the first surface TL of the substrate 26 are located between the first surface TL_15 of the cover board 15 and the second surface BL_15 of the substrate 26. The touchpad area 21 is disposed on the first surface TL of the substrate 26 for generating a touch signal TC_sig according to a touch situation touched on the touchpad area 21 by a user, e.g. the user may slide or move fingers on the touchpad device 10 to manipulate a cursor on the computer system 1, or write words to input commands to the computer system 1. The antenna 22 is disposed on the first surface TL of the substrate 26 for receiving and transmitting an RF signal RF_sig to perform Near Field Communication. The antenna 22 may be stuck between the second surface BL_15 of the cover board 15 and the ferromagnetic sheet 23, or formed on the second surface BL_15 of the cover board 15 by a Laser Direct Structuring technology. The touchpad area 21 may be surrounded by the antenna 22, an empty area of the antenna 22 may be an air medium 25. Besides, in other embodiments, the empty area of the antenna 22 may be a medium made of a glass fiber substrate or a Flexible Printed Circuit.

If there is another computer system existing in a wireless coverage of the multi-function RF device 20 that can perform Near Field Communication with the multi-function RF device 20, the antenna 22 may be used for transmitting and receiving the RF signal RF_sig to perform data transmission and exchange with another computer system. Moreover, the antenna 22 may be regarded as a RFID antenna for sensing a RFID tag 27 to generate the RF signal RF_sig. In other words, the multi-function RF device 20 may be regarded as a multi-function card reader for reading the RFID tag 27, such as a credit card, a bank card or a door card supporting the RFID function, to perform electric payment or identity recognition. The ferromagnetic sheet 23 may be stuck between the antenna 22 and the substrate 26. In this embodiment, the ferromagnetic sheet 23, e.g. a Ferrite Sheet, may be parallel to the touchpad area 21 for blocking electromagnetic noises from the touchpad area 21 or other electronic elements inside the computer system 1, so as to prevent the RF signal RF_sig of the antenna 22 from being interfered with by the noises. In other words, the Ferrite Sheet 23 may mitigate Electromagnetic Interference between the antenna 22 and the touchpad area 21 or the computer system 1 to improve a reception sensitivity of the antenna 22 and signal quality of the RF signal RF_sig. The control module 24 is disposed on the second surface BL of the substrate 26, and is electrically connected to the antenna 22 and the touchpad area 21. The control module 24 includes a touch control unit 240 and an RF control unit 242. The touch control unit 240 is used for processing the touch signal TC_sig to generate a touch control signal TC_ctrl to the computer system 1. The RF control unit 242 is used for processing the RF signal RF_sig to generate an identification signal ID_sig to the computer system 1. The multi-function RF device 20 is coupled to a central processor 13 of the computer system 1, the central processor 13 is used for processing the touch control signal TC_ctrl and the identification signal ID_sig. In such a structure, the multi-function RF device 20 may combine the function of touch control and the function of wireless transmission or sensing into a single module, which may simplify a production process of the computer system 1 and reduce production cost.

Figure 2C:
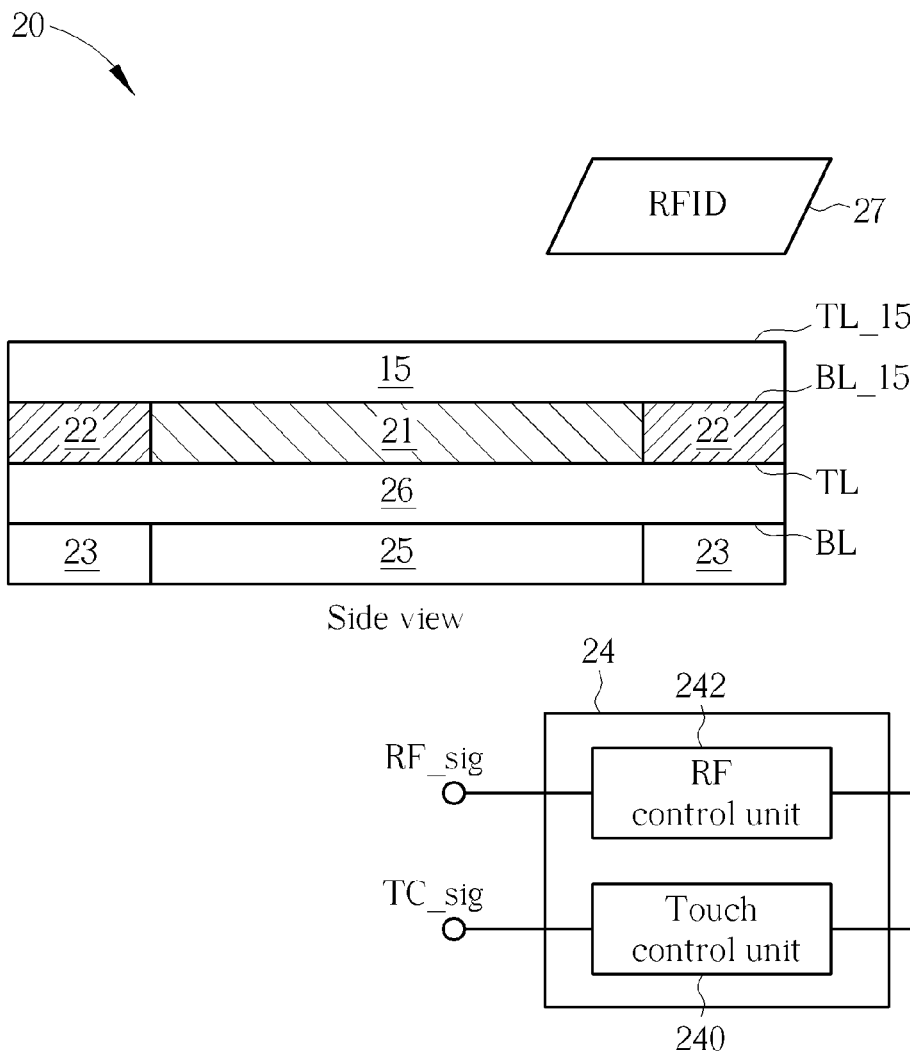
FIG. 2C and FIG. 2D are side views illustrating the multi-function RF device shown in FIG. 2 having different stacks.
Figure 2D:
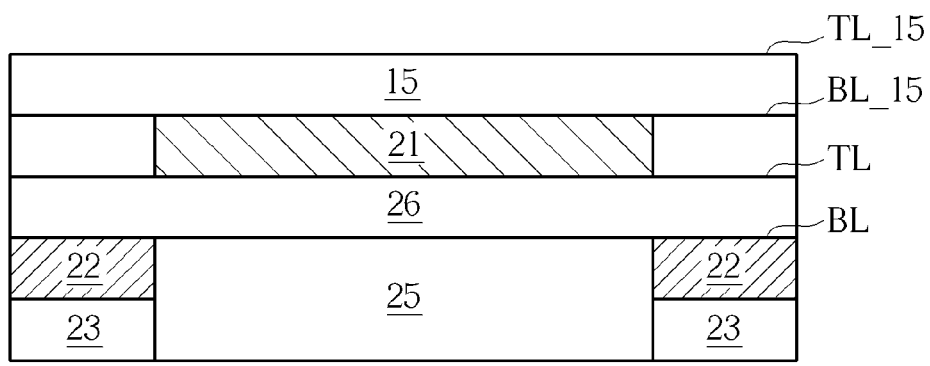
Figure 2D:
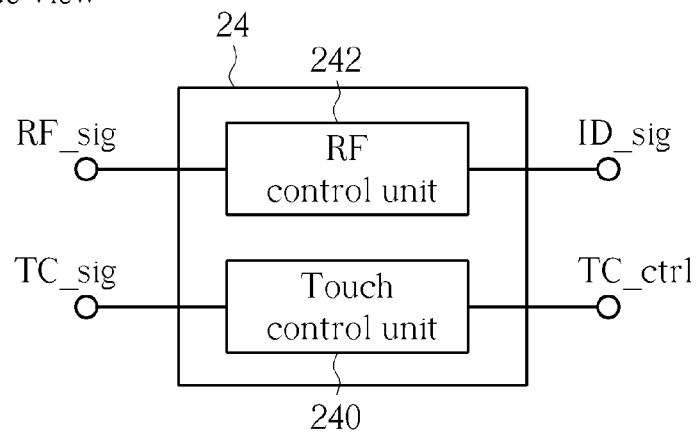

Noticeably, in FIG. 2B, a designer may adjust stacks and relative locations of the elements included in the multi-function RF device 20 according to practical requirements and different production technologies, such as a Laser Direct Structuring technology, a Screen Printing technology or an Antenna On Glass technology, which is not limited in the present embodiment. For example, please refer to FIG. 2C and FIG. 2D, which are side views illustrating the multi-function RF device 20 having different stacks. As shown in FIG. 2C, the antenna 22 and the touchpad area 21 may be simultaneously printed on the first surface TL of the substrate 26, and the ferromagnetic sheet 23 may be stuck on the second surface BL of the substrate 26, which may simplify the production process of the multi-function RF device 20. As a result, a production procedure to stick the antenna 22 may be omitted. Or, the antenna 22 may be formed on the second surface BL_15 of the cover board 15 by the Laser Direct Structuring technology, which may ensure the antenna 22 is well fixed on the cover board 15 to improve a product reliability of the multi-function RF device 20. In other embodiments, the antenna 22 may be formed on the first surface TL_15 of the cover board 15 (not shown in the figures) by the Laser Direct Structuring technology, and the antenna 22 may be sprayed with decorative paint to form a surface cover. In FIG. 2D, the antenna 22 is disposed on the second surface BL of the substrate 26, and the ferromagnetic sheet 23 is stuck onto an area of the antenna 22 by glue.

In short, the multi-function RF device 20 may combine the function of touch control and the function of wireless transmission or sensing into a single module, which may simplify the production process of the computer system 1 and reduce production costs. Furthermore, in order to improve the quality of wireless communication of the multi-function RF device 20, the present invention may utilize the ferromagnetic sheet 23 to block the noises from the touchpad area 21 or other electronic elements inside the computer system 1 to reduce the noises interfering with the RF signal RF_sig received by the antenna 22, which may improve the reception sensitivity of the antenna 22.

Figure 3A:
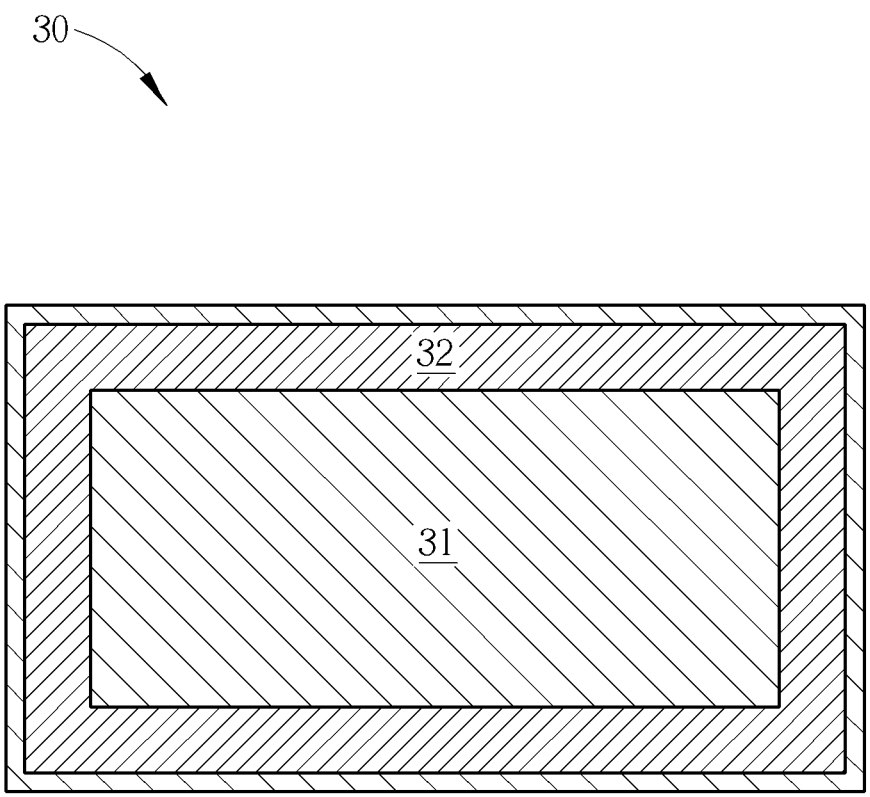
FIG. 3A and FIG. 3B are respectively a top view and a side view of a multi-function RF device according to an embodiment of the present invention.
Figure 3B:
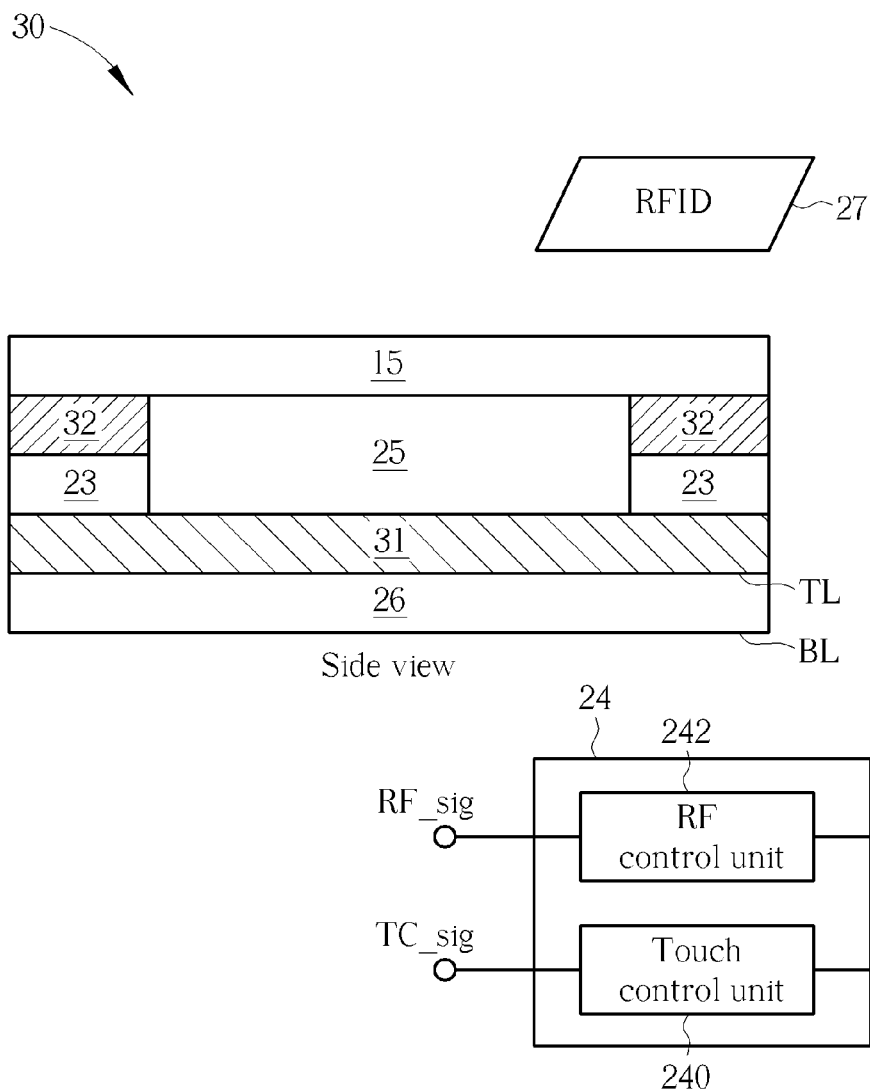
Figure 3C:
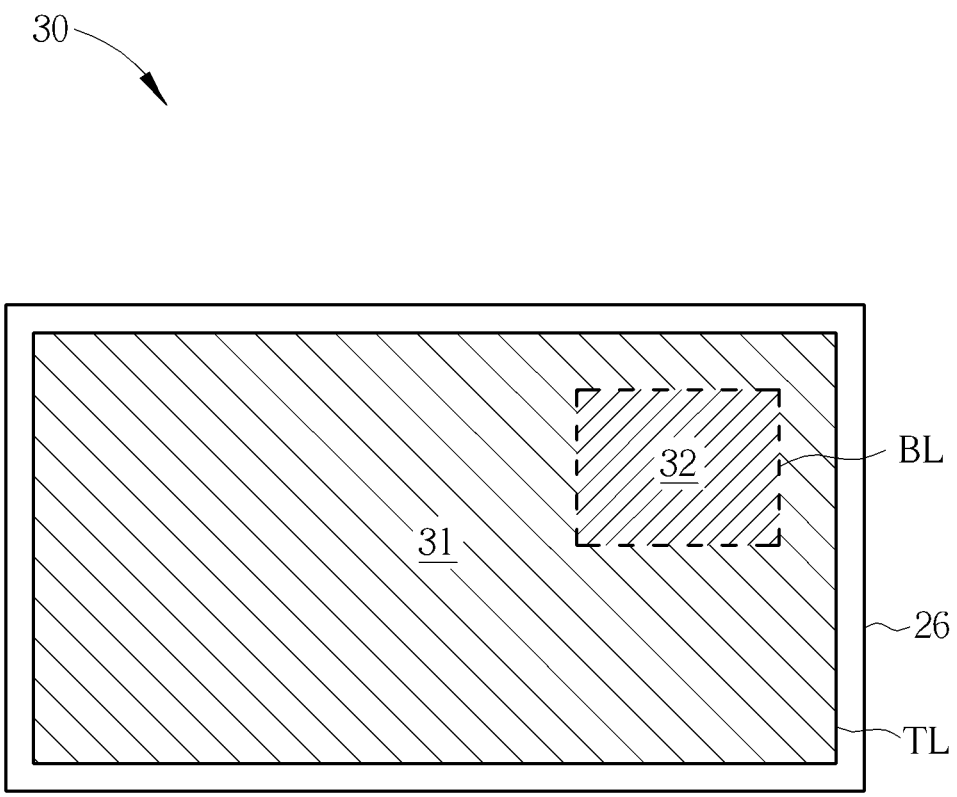
FIG. 3C is a top view of the multi-function RF device shown in FIG. 3 having an adjusted structure according to an embodiment of the present invention.

Please note that the touchpad area 21 may be surrounded by the antenna 22, i.e. the antenna 22 may be not overlapped with the touchpad area 21. Moreover, the antenna may be disposed in to the multi-function RF device in other ways, for example, the antenna and the touchpad area may be overlapped to have a various design flexibilities in the multi-function RF device. Please refer to FIG. 3A to FIG. 3C. FIG. 3A and FIG. 3B are respectively a top view and a side view of a multi-function RF device 30 according to an embodiment of the present invention, FIG. 3C is a top view of the multi-function RF device 30 having an adjusted structure according to an embodiment of the present invention. The multi-function RF device 30 includes a touchpad area 31, an antenna 32, the ferromagnetic sheet 23, the control module 24, the cover board 15 and the substrate 26. As shown in FIG. 3, the antenna 32 is disposed within an interior region of the touchpad area 31 and overlapped with the touchpad area 31, however, which is not limiting, a designer may adjust a size of the antenna 32 according to practical requirements, such that the antenna 32 and the touchpad area 31 may be completely or partially overlapped. As shown in FIG. 3B, the touchpad area 31 is formed on the first surface TL of the substrate 26 for generating the touch signal TC_sig according to the touch situation touched on the touchpad area 31 by the user. The antenna 32 is used for sensing the RFID tag 27 to generate the RF signal RF_sig accordingly. The ferromagnetic sheet 23 is disposed between the antenna 32 and the touchpad area 31 for blocking the noises from the touchpad area 31 or other electronic elements inside the computer system 1, so as to prevent the RF signal RF_sig received by the antenna 32 from being interfered with by the noises. The ferromagnetic sheet 23 can be a ferrite sheet in this embodiment. The control module 24 is disposed on a second surface BL of the substrate 26, the control module 24 includes a touch control unit 240 and a RF control unit 242. The touch control unit 240 is used for processing the touch signal TC_sig to generate a touch control signal TC_ctrl to the computer system 1. The RF control unit 242 is used for processing the RF signal RF_sig to generate an identification signal ID_sig to the computer system 1.

Besides, the antenna 32 shown in FIG. 3A surrounds the touchpad area 31 and is disposed on the first surface TL the substrate 26, in comparison, the antenna 32 shown in FIG. 3C may be disposed on any regions in the second surface BL of the substrate 26, and the antenna 32 is overlapped with an area of the touchpad area 31 projected onto the second surface BL of the substrate 26.

As a result, the designer may adjust where the antennas 22 and 32 are located or stacks of the elements in the multi-function RF devices 20 and 30 according to practical requirements, and adjust sizes of the antenna 22 and 32 or sizes of the touchpad areas 21 and 31, such that the antenna and touchpad area may be completely, partially, or not overlapped with each other to have a various design flexibility.

Figure 4:
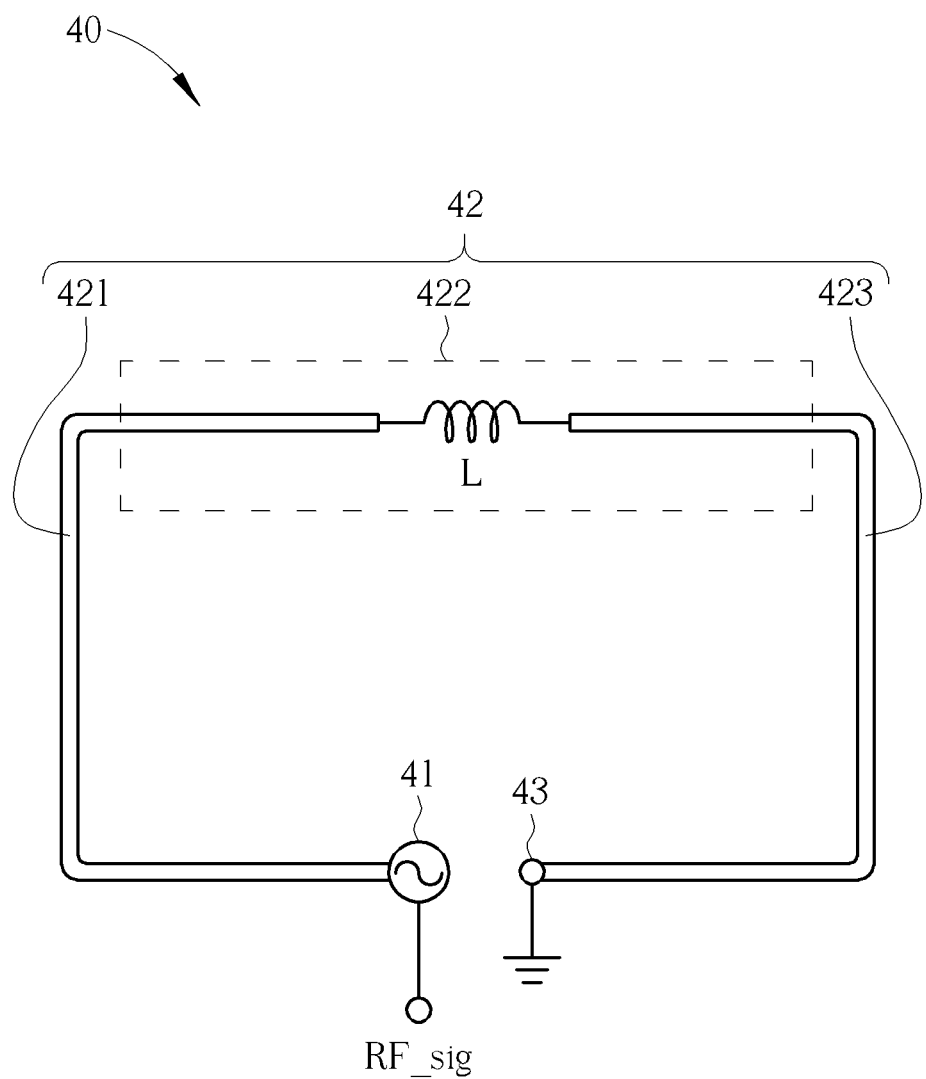
FIG. 4 is a schematic diagram of an antenna according to an embodiment of the present invention.

Please refer to FIG. 4 for designing an antenna pattern, FIG. 4 is a schematic diagram of an antenna 40 according to an embodiment of the present invention. The antenna 40 includes a feed-in terminal 41, a radiator 42 and a ground 43. The feed-in terminal 41 may be used for feeding the RF signal RF_sig. The radiator 42 is electrically connected to the feed-in terminal 41 for radiating the RF signal RF_sig. The ground 43 is electrically connected to the radiator 42 for providing ground. As shown in FIG. 4, the antenna 40 may be a loop antenna, wherein the radiator 42 of the antenna 40 includes the radiation units 421, 422 and 423, the radiation unit 421 is electrically connected to the feed-in terminal 41, the radiation unit 422 is electrically connected to the radiation unit 421, and the radiation unit 423 is electrically connected between the radiation unit 422 and the ground 43. The radiation unit 422 further includes an inductor L for increasing an inductance of the radiation unit 422, or adjusting a matching impedance of the radiator 42, and a signal matching or radiation frequencies of the antenna 40 may be adjusted accordingly. Moreover, a location and number of the inductor L are not limited, the inductor L or other inductor may be disposed on the radiator 42 as well. Lengths of the radiation units 421, 422 and 423 are adjustable, such that an electrical length of the radiator 42 may be changed to adjust the radiation frequencies of the antenna 40. A location of the feed-in terminal 41 is not limited to a location shown in FIG. 4, the location of the feed-in terminal 41 is adjustable according to practical requirements. Methods to feed the RF signal RF_sig into the feed-in terminal 41 are not limited, for example, the RF signal RF_sig may be fed and transmitted from the RF control unit 242 to the feed-in terminal 41 by a coaxial cable or connection elements such as a pogo pin and a spring. Or, a signal trace may be printed on the substrate 26 to directly electrically connect the feed-in terminal 41 with the RF control unit 242.

Figure 5A:
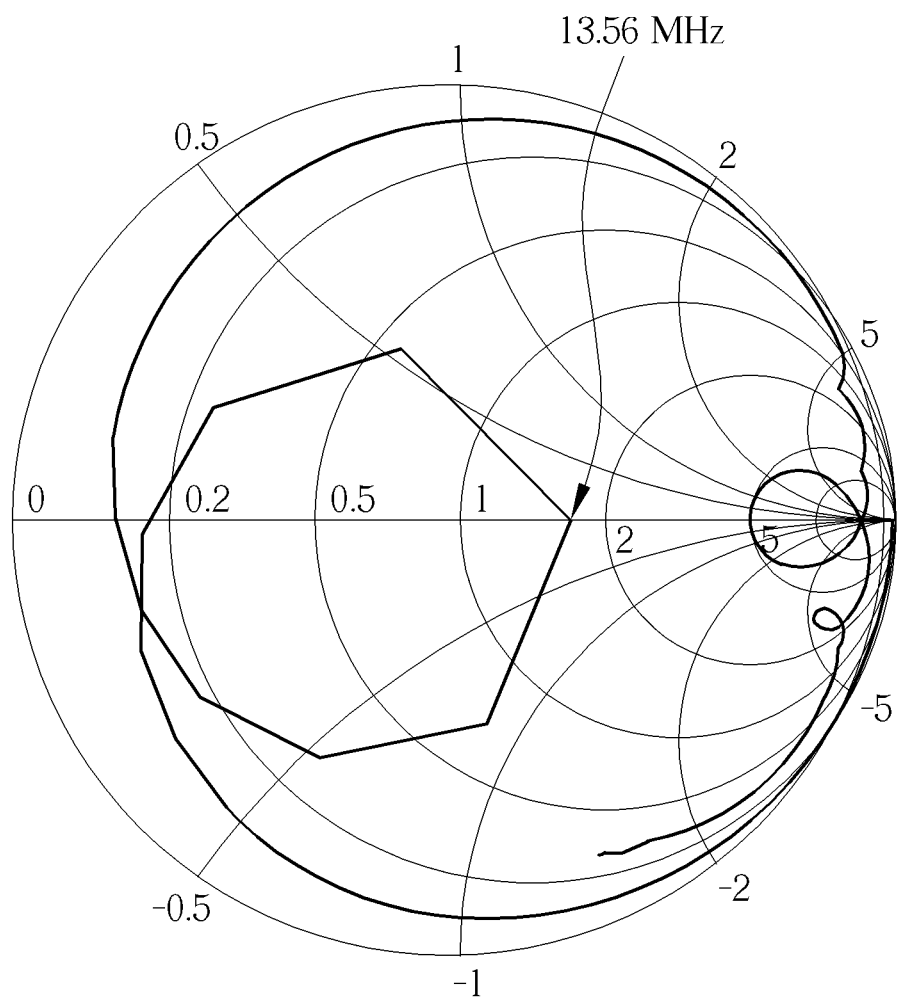
FIG. 5A is a Smith chart of the antenna shown in FIG. 4.
Figure 5B:
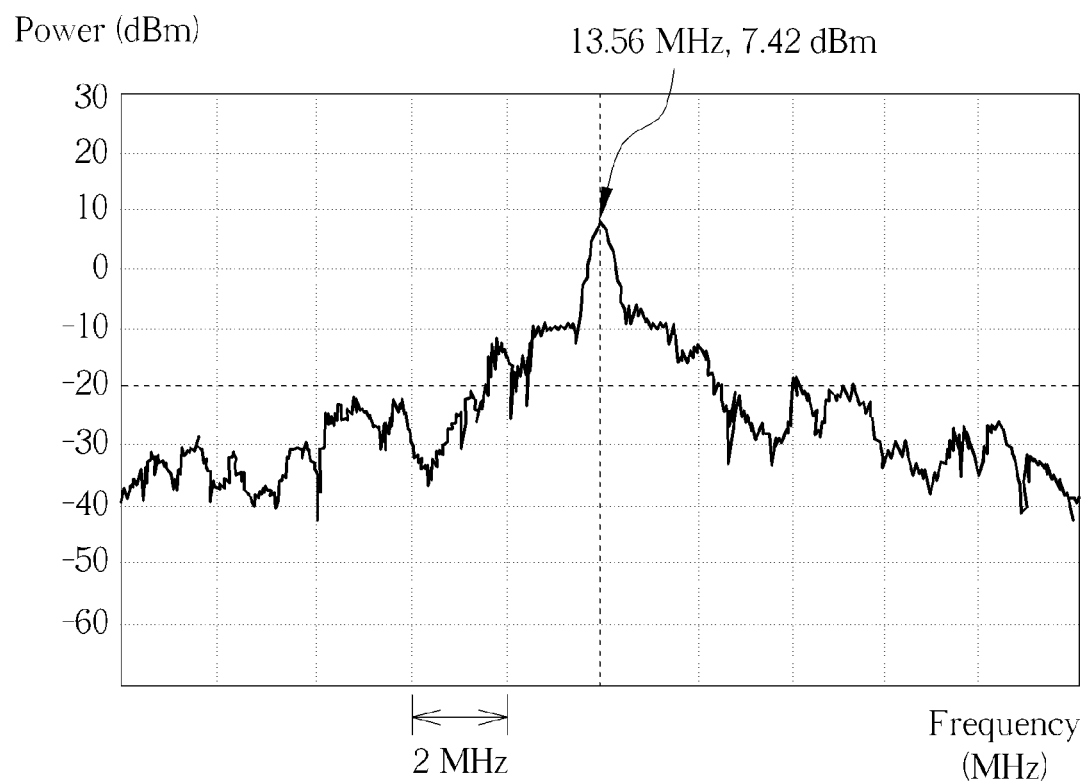
FIG. 5B is a schematic diagram of radiation power of the antenna shown in FIG. 4.

Please refer to FIG. 5A and FIG. 5B. FIG. 5A is a Smith chart of the antenna 40. FIG. 5B is a schematic diagram of radiation power of the antenna 40. As shown in FIG. 5A, a center radiation frequency 13.56 MHz of the antenna 40 for Near Field Communication lies around the center of Smith chart, which means the antenna 40 is well matched at 13.56 MHz. As shown in FIG. 5B, an input power is 30 dBm, the highest output power of the antenna 40, i.e. 7.42 dBm, lies in 13.56 MHz. Therefore, the antenna 40 may be able to perform the Near Field Communication in the required operating frequency.

Figure 6:
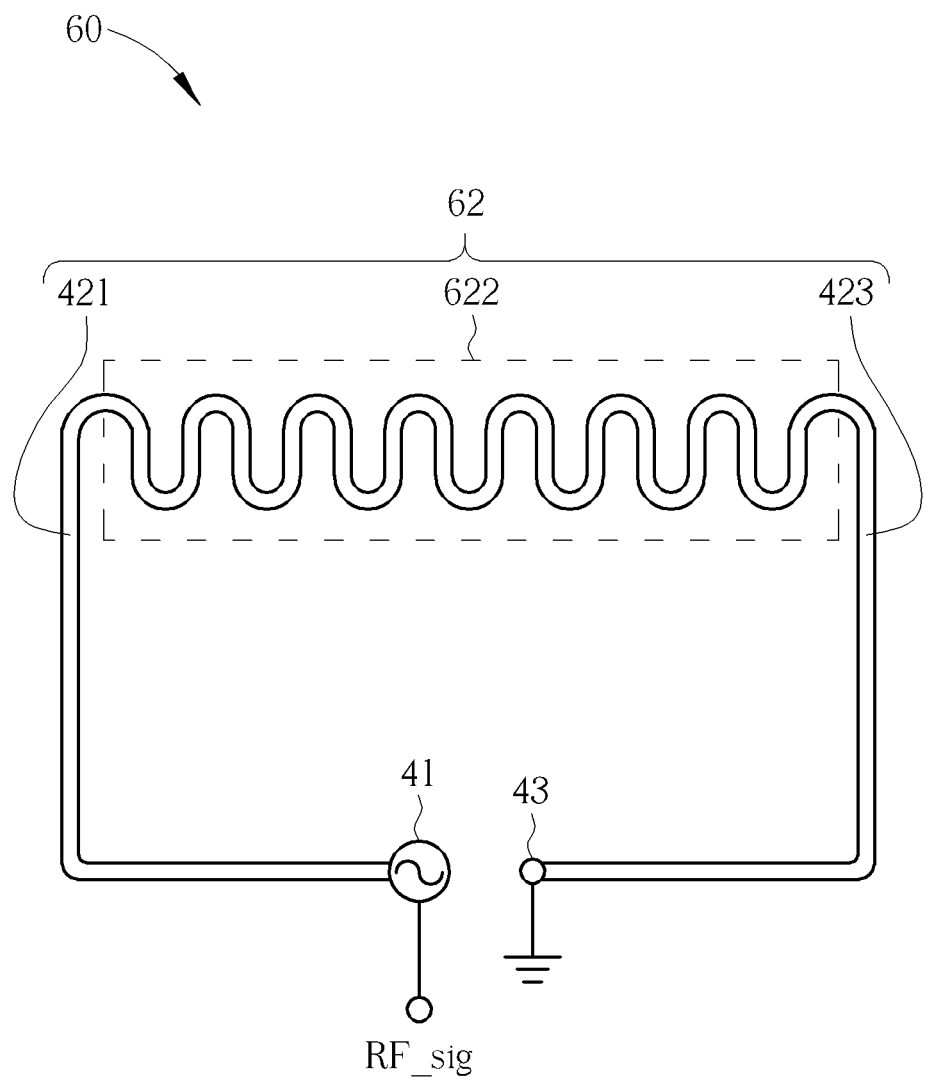
FIG. 6 is a schematic diagram of an antenna according to another embodiment of the present invention.

Furthermore, a pattern of the antenna 40 is not limited as long as the operating frequency is met. For example, please refer to FIG. 6, which is a schematic diagram of an antenna 60 according to another embodiment of the present invention. Please note that a radiator 62 of the antenna 60 is different from the radiator 42 of the antenna 40. The radiation units 421, 422 and 423 of the radiator 42 have a straight-bar shape, while a radiation unit 622 of the radiator 62 has a meandering shape. The meandering shaped radiation unit 622 may have a greater inductance than the straight-bar shaped radiation units 421, 422 and 423. In other words, meandering a straight pattern of a radiation unit may be equivalent to cascading the inductor L to the radiation unit 422. As a result, the antenna 60 may be equivalent to the antenna 40 but saving cost for disposing the inductor L.

Figure 7:
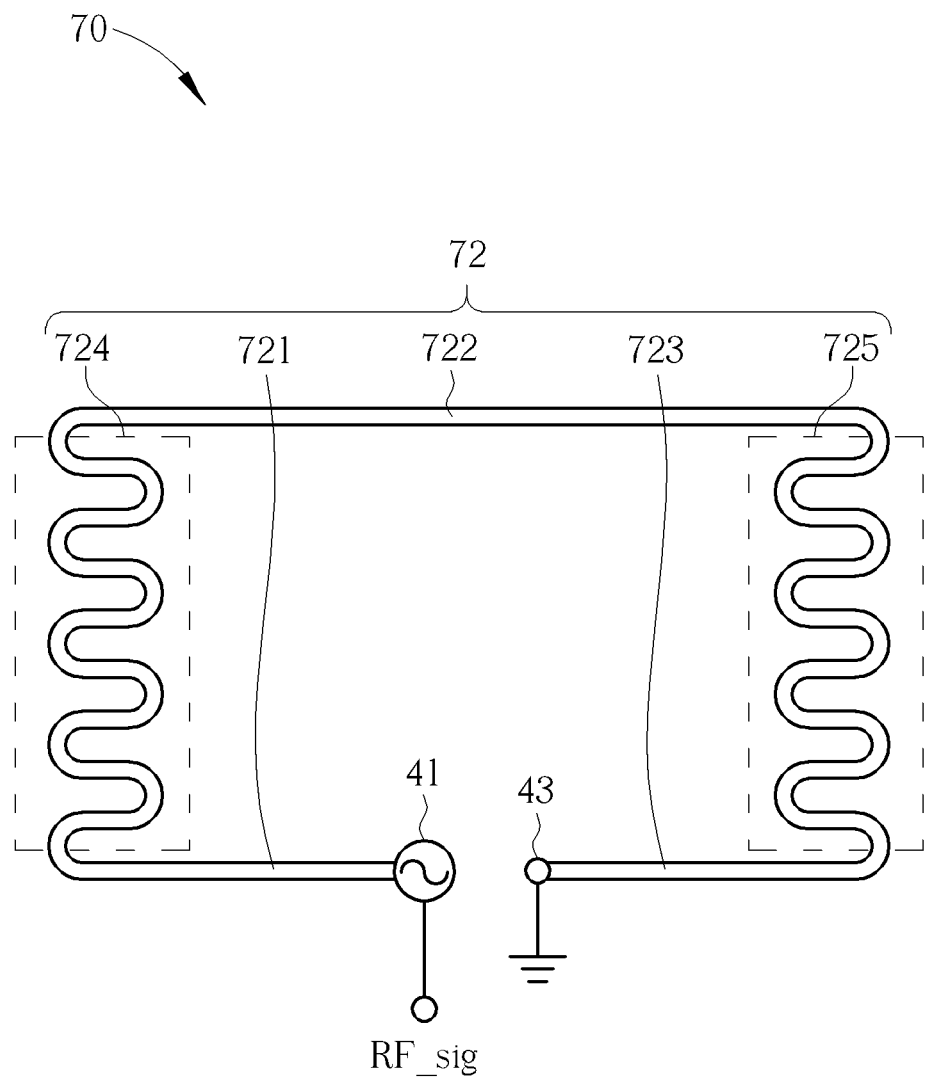
FIG. 7 is a schematic diagram of an antenna according to another embodiment of the present invention.

Please refer to FIG. 7, which is a schematic diagram of an antenna 70 according to another embodiment of the present invention. Please note that a radiator 72 of the antenna 70 is different from the radiator 42 of the antenna 40 and the radiator 62 of the antenna 60. Radiation units 724 and 725 of the radiator 72 have a meandering shape, radiation units 721, 722 and 723 have a straight-bar shape. Likewise, the meandered radiation unit 724 may be equivalent to cascading the inductor L between the radiation units 721 and 722, the meandered radiation unit 725 may be equivalent to cascading the inductor L between the radiation units 722 and 723, and a location where the radiation unit is meandered may be properly adjusted, which may a flexible design of design the antenna 70.

Figure 8A:
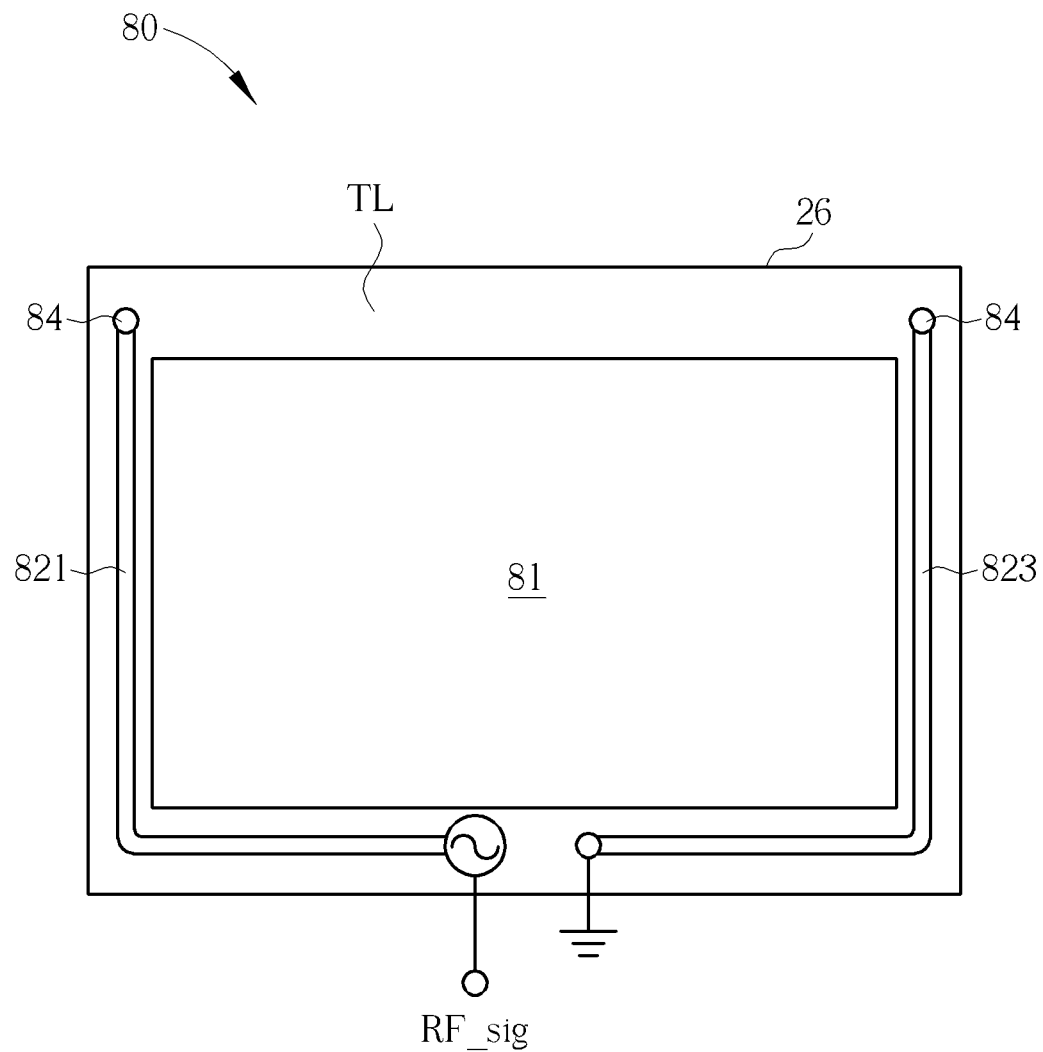
FIG. 8A and FIG. 8B are respectively a top view and a bottom view of a multi-function RF device according to an embodiment of the present invention.
Figure 8B:
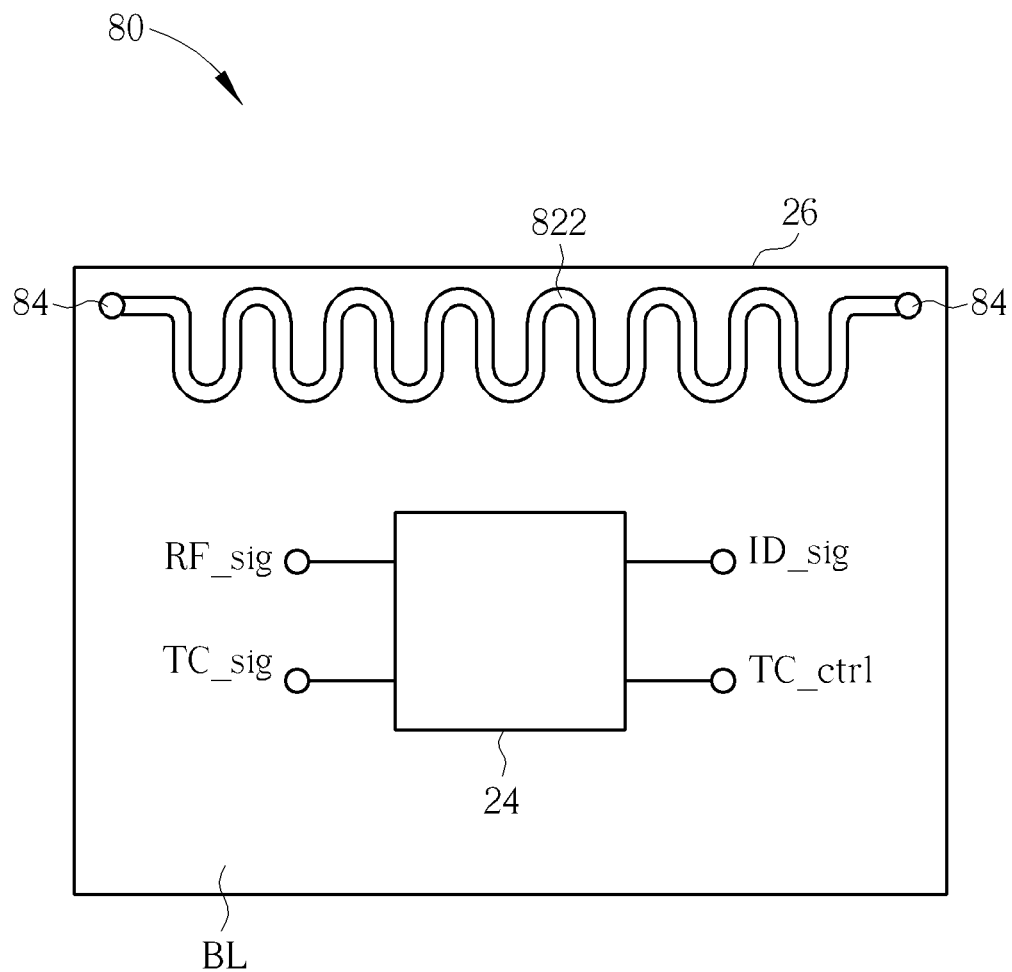

For simplifying the production process of the multi-function RF device, the antenna, the touchpad area and the control module 24 may be formed on the single the substrate 26. Please refer to FIG. 8A and FIG. 8B, which are respectively a top view and a bottom view of a multi-function RF device 80 according to an embodiment of the present invention. As shown in FIG. 8A, a touchpad area 81 and radiation units 821 and 823 are formed on the first surface TL of the substrate 26. In FIG. 8B, a radiation unit 822 is formed on the second surface BL the substrate 26, a plurality of via 84 are used for electrically connecting the radiation unit 822 between the radiation units 821 and 823. The control module 24 may be disposed on the second surface BL of the substrate 26 by a Surface Mount Technology. On the other hand, the ferromagnetic sheet 23 (not shown in FIG. 8A and FIG. 8B) may cover an area of the radiation unit 822, which may reduce electromagnetic interference between the radiator 822 and other electronic elements as well, which is similar to FIG. 2D. As a result, the integrally formed multi-function RF device 80 may have a production process to reduce production cost.

Figure 9A:
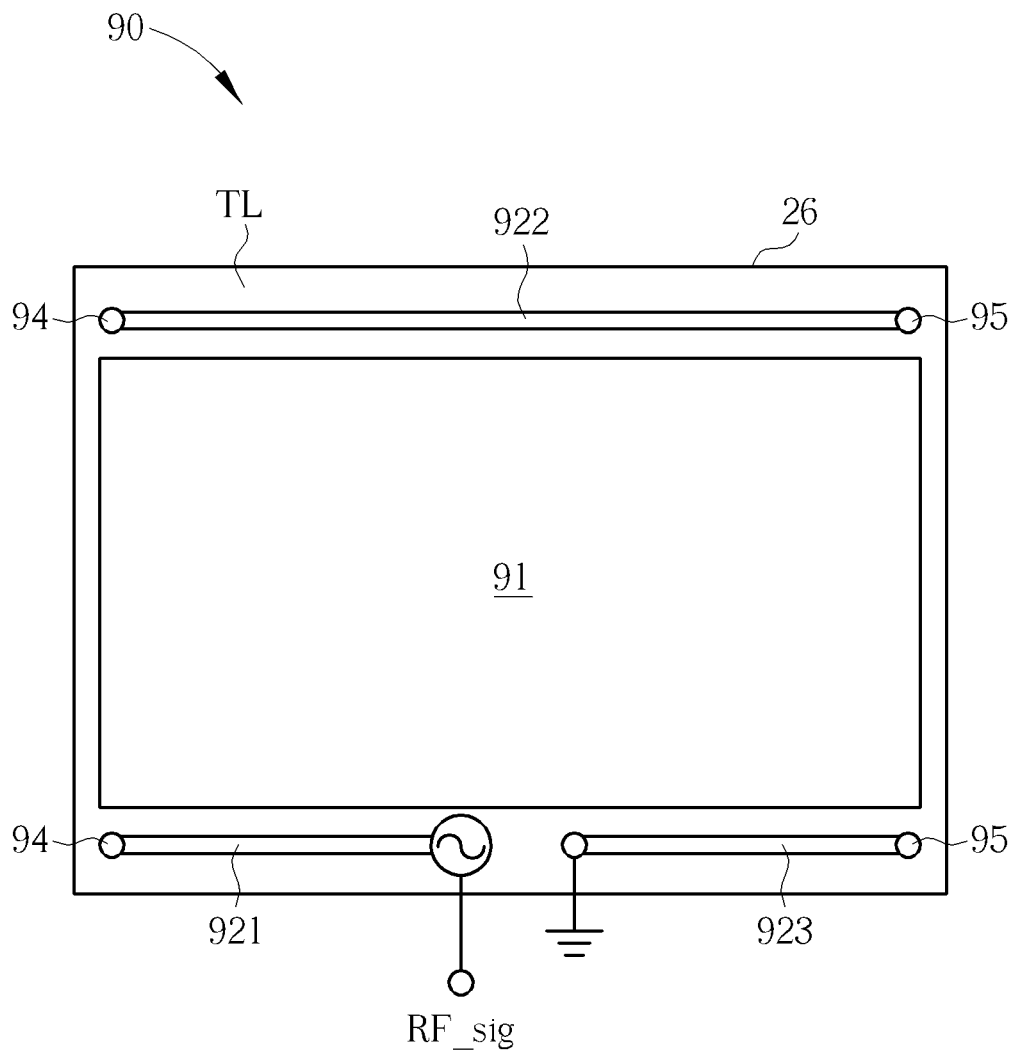
FIG. 9A and FIG. 9B are respectively a top view and a bottom view of a multi-function RF device according to an embodiment of the present invention.
Figure 9B:
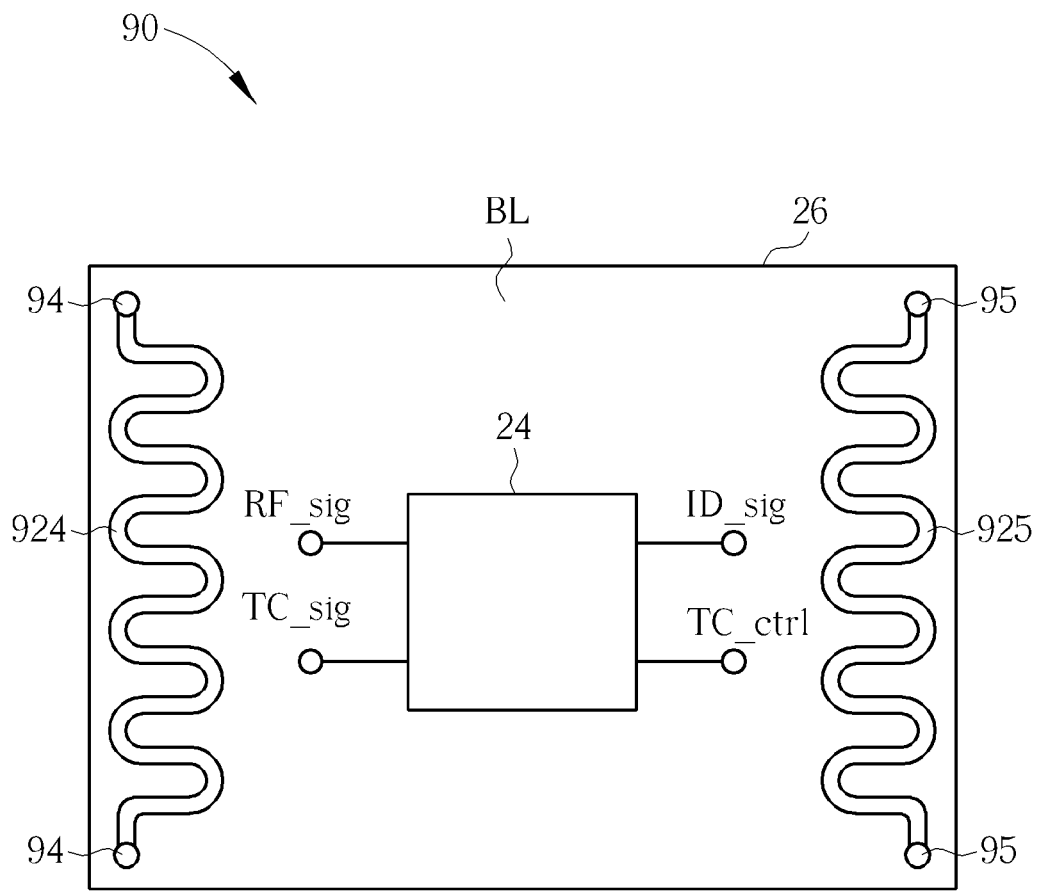

Please refer to FIG. 9A and FIG. 9B, which are respectively a top view and a bottom view of a multi-function RF device 90 according to an embodiment of the present invention. The multi-function RF device 90 is integrally formed. As shown in FIG. 9A, a touchpad area 91 and straight-bar shaped radiation units 921, 922 and 923 are formed on the first surface TL of the substrate 26. In FIG. 9B, meandering shaped radiation units 924 and 925 are formed on the second surface BL of the substrate 26, a plurality of via 94 is used for electrically connecting the radiation unit 924 with the radiation units 921 and 922, a plurality of via 95 is used for electrically connecting the radiation unit 925 with the radiation units 922 and 923. The ferromagnetic sheet 23 (not shown in FIG. 9A and FIG. 9B) may cover areas of the radiation units 924 and 925, which may reduce electromagnetic interference between the radiation units 924 and 925 and other electronic elements. As a result, the integrally formed multi-function RF device 90 may have a production process to reduce production cost.

Figure 10:
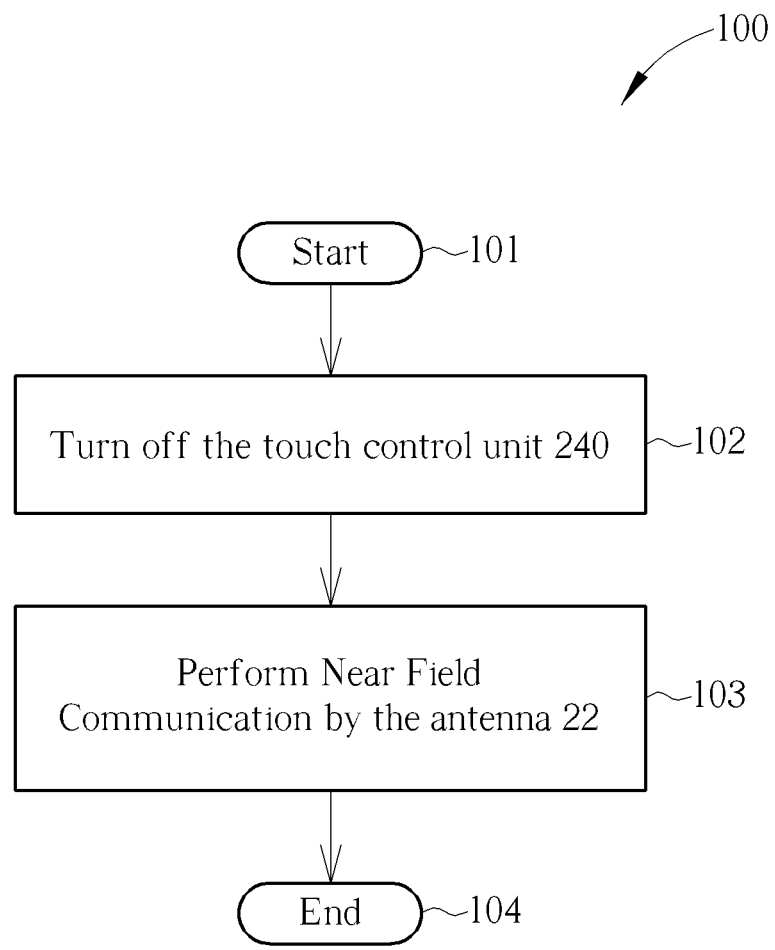
FIG. 10 is a schematic diagram of a multi-function RF device operating process according to an embodiment of the present invention.

Operations of the multi-function RF devices 20, 30, 80 and 90 may be summarized into a multi-function RF device operating process 100. As shown in FIG. 10, the multi-function RF device operating process 100 includes the following steps:

Step 101: Start.
Step 102: Turn off the touch control unit 240.
Step 103: Perform Near Field Communication by the antenna 22.
Step 104: End.

Details of the operating process 100 may be obtained by referring to descriptions of the multi-function RF devices 20 and 30, which is omitted.

To sum up, since outlook requirements of the electronic product increases and the metal housing may shield the wireless signals to have an influence to the quality of wireless communication of the computer system. To improve this problem, the present invention provides the multi-function RF device integrated with the touchpad device in the computer system, such that the wireless signal may be radiated from the non-metal cover board of the touchpad device, and the ferromagnetic sheet may block the noises from other electronic elements of the computer system, so as to improve the reception sensitivity of the antenna. The multi-function RF device of the present invention may have a good integration, simple production process and lower production cost without an influence to the appearance of the computer system. Besides, the present invention also provides various methods to design the antenna to broaden the various design flexibility of the multi-function RF device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-function Radio-Frequency device integrated into a computer system, comprising:
    a substrate including a first surface and a second surface opposite to each other;
    a touchpad area disposed on the first surface of the substrate for generating a touch signal according to a touch situation touched on the touchpad area by a user;
    an antenna disposed on the first surface and/or the second surface of the substrate for receiving and transmitting a Radio-Frequency signal, comprising:
        a feed-in terminal for feeding a Radio-Frequency signal;
        a radiator electrically connected to the feed-in terminal for radiating the Radio-Frequency signal; and
        a ground electrically connected to the radiator for providing ground; and
    a control module disposed on the second surface of the substrate and coupled to the touchpad area and the antenna for generating a touch control signal according to the touch signal and generating an identification signal according to the Radio-Frequency signal to the computer system.

2. The multi-function Radio-Frequency device of claim 1, further comprising a cover board including a first surface and a second surface opposite to each other, wherein the second surface of the cover board and the first surface of the substrate are located between the first surface of the cover board and the second surface of the substrate.

3. The multi-function Radio-Frequency device of claim 2, wherein the antenna is disposed on the first surface of the cover board and/or the second surface of the cover board.

4. The multi-function Radio-Frequency device of claim 2, wherein the antenna is disposed on the first surface of the cover board, the second surface of the cover board, the first surface of the substrate or the second surface of the substrate by glue, a Laser Direct Structuring technology, an Antenna On Glass technology or a Screen Printing technology.

5. The multi-function Radio-Frequency device of claim 1, further comprising a ferromagnetic sheet disposed on the first surface of the substrate and covering an area of the antenna, wherein the ferromagnetic sheet is located between the antenna and the first surface of the substrate, or located between the antenna and the touchpad area.

6. The multi-function Radio-Frequency device of claim 1, further comprising a ferromagnetic sheet disposed on the second surface of the substrate and covering an area of the antenna, wherein the substrate is located between the antenna and the ferromagnetic sheet, or the antenna is located between the second surface of the substrate and the ferromagnetic sheet.

7. The multi-function Radio-Frequency device of claim 1, wherein the radiator comprises at least an inductor.

8. The multi-function Radio-Frequency device of claim 1, wherein the radiator comprises a plurality of radiation units, wherein at least one of the plurality of radiation units has a straight-bar shape or a meandering shape.

9. The multi-function Radio-Frequency device of claim 1, wherein the radiator comprises:
    a plurality of radiation units, wherein at least a first radiation unit of the plurality of radiation units is disposed on the first surface of the substrate, and a second radiation unit of the plurality of radiation units is disposed on the second surface of the substrate; and
    at least one via for electrically connecting the first the radiation unit to the second the radiation unit.

10. The multi-function Radio-Frequency device of claim 1, wherein the control module comprises:
- a touch control unit for processing the touch signal to generate the touch control signal to the computer system; and
- a Radio-Frequency control unit for processing the Radio-Frequency signal to generate the identification signal to the computer system.

11. The multi-function Radio-Frequency device of claim 1, wherein the antenna is a RFID (Radio-Frequency Identity) antenna for sensing a RFID tag to generate the Radio-Frequency signal accordingly.

12. The multi-function Radio-Frequency device of claim 1, wherein the antenna is disposed on the second surface of the substrate, and the antenna is overlapped with an area of the touchpad area projected onto the second surface of the substrate.

13. The multi-function Radio-Frequency device of claim 1, wherein the touchpad area is surrounded by the antenna, the antenna and the touchpad area are completely overlapped with each other.

14. The multi-function Radio-Frequency device of claim 1, wherein the touchpad area is surrounded by the antenna, the antenna and the touchpad area are partially overlapped with each other.

15. The multi-function Radio-Frequency device of claim 1, wherein the touchpad area is surrounded by the antenna, the antenna and the touchpad area are not overlapped with each other.

16. A computer system, comprising:
a multi-function Radio-Frequency device comprising:
- a substrate including a first surface and a second surface opposite to each other;
- a touchpad area disposed on the first surface of the substrate for generating a touch signal according to a touch situation touched on the touchpad area by a user;
- an antenna disposed on the first surface and/or the second surface of the substrate for receiving and transmitting a Radio-Frequency signal, comprising:
  - a feed-in terminal for feeding a Radio-Frequency signal;
  - a radiator electrically connected to the feed-in terminal for radiating the Radio-Frequency signal; and
  - a ground electrically connected to the radiator for providing ground; and
- a control module disposed on the second surface of the substrate and coupled to the touchpad area and the antenna for generating a touch control signal according to the touch signal and generating an identification signal according to the Radio-Frequency signal to the computer system; and
a central processor coupled to the multi-function Radio-Frequency device for processing the touch control signal and the identification signal.

17. The multi-function Radio-Frequency device of claim 16, wherein the radiator comprises at least an inductor.

18. The multi-function Radio-Frequency device of claim 16, wherein the radiator comprises a plurality of radiation units, wherein at least one of the plurality of radiation units has a straight-bar shape or a meandering shape.

19. The multi-function Radio-Frequency device of claim 16, wherein the radiator comprises:
- a plurality of radiation units, wherein at least a first radiation unit of the plurality of radiation units is disposed on the first surface of the substrate, and a second radiation unit of the plurality of radiation units is disposed on the second surface of the substrate; and
- at least one via for electrically connecting the first the radiation unit to the second the radiation unit.

* * * * *